((12)) United States Patent
Cox et al.

(10) Patent No.: US 9,665,141 B2
(45) Date of Patent: May 30, 2017

(54) THERMAL MANAGEMENT OF AN INTEGRATED CIRCUIT (71) Applicant: Apple Inc., Cupertino, CA (US)

(72) Inventors: Keith Cox, Campbell, CA (US);
Kit-Man Wan, Cupertino, CA (US);
Gaurav Kapoor, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 202 days.

(21) Appl. No.: 14/297,472

(22) Filed: Jun. 5, 2014

(65) Prior Publication Data

US 2014/0365793 A1 Dec. 11, 2014

Related U.S. Application Data (60) Provisional application No. 61/831,532, filed on Jun. 5, 2013.

(51) Int. Cl.
*G06F 1/00* (2006.01)
*G06F 1/20* (2006.01)
*G06F 1/32* (2006.01)

(52) U.S. Cl.
CPC ............ *G06F 1/206* (2013.01); *G06F 1/3203* (2013.01); *Y02B 60/1271* (2013.01); *Y02B 60/1275* (2013.01)

(58) Field of Classification Search
CPC ...... G06F 1/3203; G06F 1/3287; G06F 1/206; Y02B 60/1217; Y02B 60/1275
See application file for complete search history.

(56) References Cited

U.S. PATENT DOCUMENTS

| | | | | |
|---|---|---|---|---|
| 5,590,061 A * | 12/1996 | Hollowell, II | ......... | G06F 1/206 702/130 |
| 2004/0117677 A1* | 6/2004 | Jahagirdar | ............. | G06F 1/206 713/320 |
| 2007/0191993 A1* | 8/2007 | Wyatt | ...................... | G11C 5/00 700/299 |
| 2009/0044027 A1* | 2/2009 | Piazza | .................. | G06F 1/3203 713/300 |
| 2009/0125741 A1* | 5/2009 | Burton | .................... | G06F 1/206 713/323 |

(Continued)

*Primary Examiner* — Mohammed Rehman
*Assistant Examiner* — Gayathri Sampath
(74) *Attorney, Agent, or Firm* — Kilpatrick Townsend & Stockton (57) ABSTRACT Methods for thermal management of an integrated circuit are disclosed. In particular, a dual control loop, having a first control loop and a second control loop, is used to maintain the temperature of an integrated circuit at a first temperature and a second temperature, respectively. In order to prevent the integrated circuit from overheating during periods of rapid temperature increase, the second control loop may be configured to control temperature at the second temperature below the specification limit of the integrated circuit by reducing power to the integrated circuit. The second control loop samples and maintains temperature of the integrated circuit at time intervals relatively faster than that of the first control loop. However, the second control loop is configured to release control to the first control loop when the temperature of the integrated circuit is reduced. The first control loop may then control power to the integrated circuit.

19 Claims, 6 Drawing Sheets (56) References Cited

U.S. PATENT DOCUMENTS

| | | | |
|---|---|---|---|
| 2010/0213919 A1* | 8/2010 | Takayanagi | G06F 1/206 323/318 |
| 2013/0166095 A1* | 6/2013 | Hadderman | G05D 23/1919 700/300 |
| 2013/0246820 A1* | 9/2013 | Branover | G06F 1/3296 713/320 |
| 2014/0006818 A1* | 1/2014 | Doshi | G06F 1/3203 713/320 |

* cited by examiner

THERMAL MANAGEMENT OF AN INTEGRATED CIRCUIT

CROSS-REFERENCE TO RELATED APPLICATION(S)

This application claims the benefit of priority under 35 U.S.C §119(e) to U.S. Provisional Application No. 61/831,532, filed Jun. 5, 2013, entitled "GPU/CPU BURST THERMAL MANAGEMENT," the disclosure of which is incorporated herein by reference in its entirety.

FIELD

The described embodiments relate generally to methods and apparatuses for thermal management in computer/electronic systems. In particular, the methods and apparatuses include control loops configured to manage power to a component in instances where the temperature of the component substantially increases.

BACKGROUND

It is important to address thermal management in high performance devices within thermally constrained enclosures, where relatively small electronic systems do not have sufficient thermal mass or capacity to dissipate the peak heat generated in the enclosure. Also, developments in integrated circuit technology have led to high-performance integrated circuits having temperature spikes (i.e., high temperature changes in a short period of time). During operation, a high-performance integrated circuit may enter a "high power mode" causing it to overheat, which in turns causes short-term (and possibly long-term) failure. This high power state must therefore be monitored for overheating. One approach to monitoring temperature is a single controller configured to control power at predetermined intervals and perform a process to maintain temperature at a desired level. However, the predetermined intervals may be too slow such that overheating occurs quickly between consecutive intervals. Also, continuous running of the controller may draw unnecessary power consumption from an internal power supply causing decreased performance of the device.

SUMMARY

In one aspect, a method for controlling a temperature of a component in a computing device is described. The method may include performing a first control loop operation using a monitored temperature of the component. The method may further include outputting a first power reduction control signal when the monitored temperature has reached a first threshold value. The method may further include activating a second control loop when the monitored temperature has reached a second threshold value greater than the first threshold value. The method may further include performing a second control loop operation using the monitored temperature while the second control loop is activated. The method may further include outputting a second power reduction control signal in accordance with the second control loop operation.

In another aspect, a method for controlling a temperature of a component in a computing device is described. The method may include monitoring the temperature of the component. The method may further include running a first control loop. Running the first control loop may include performing a first control loop operation in accordance with a first time interval using the monitored temperature, and outputting a first control signal based on the first control loop operation. The method may further include running a second control loop when an average value of the monitored temperature reaches a threshold value. Running the second control loop may include performing a second control loop operation in accordance with a second time interval, and outputting a second control signal based on the second control loop operation. The method may further include controlling a power distribution to the component using the first and/or second control signals.

In another aspect, a method for controlling a temperature of a component in a computing device is described. The method may include receiving a monitored temperature associated with the component. The method may also include running a proportional-integral (PI) control loop when the monitored temperature exceeds a threshold level. Running the PI control loop may include performing a (PI) control loop operation in accordance with a time interval. Running the PI control loop may further include outputting a PI control signal in accordance with the PI control loop operation. The method may further include stopping the PI control loop when the monitored temperature has dropped sufficiently below the threshold level, such that an integral term of the PI control loop is equal to about zero indicating that the PI control loop has no history of the monitored temperature exceeding the threshold level.

In another aspect, a device having a component is described. The device includes a controller which may be configured to receive temperature information associated with the component. The controller may further be configured to perform a first control loop operation using the temperature information in accordance with a first time interval. The controller may further be configured to output a first control signal based upon the first control loop operation. The controller may further be configured to perform a second control loop operation using the temperature information in accordance with a second time interval. The controller may further be configured to output a second control signal based upon the second control loop operation. Finally, the controller may further be configured to use the first and/or the second control signals to control a power distribution to the computing component.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

This detailed description is related to a computing device having a computational component. In particular, the following describes managing a power distribution to the component. In some embodiments, a control system can be used to manage the power distribution to the component. In some embodiments, the management of the power distribution can also be used to control an amount of power consumed by the component as well as a temperature of the component. It should be noted that in the context of this discussion, the control system can be embodied as a discrete controller, as software, or as firmware. In any case, the control system can generate a control signal that can be used to manage the power distribution to the component. In some embodiments, the control signal can be based upon temperature information associated with the component and provided to the control system. In one embodiment, the temperature information can include a monitored temperature of the component. The monitored temperature of the component can be provided to the control system by a discrete temperature monitor that periodically samples the temperature of the component. The temperature monitor can also take the form of a sensor disposed within the component that periodically samples the component temperature. In any case, the control system uses the monitored temperature as a basis for providing the control signal. The control system can take the form of for example, a proportional-integral-derivative (PID) controller or proportional-integral (PI) controller described in more detail below. It should be noted that although the following embodiments are described in the context of a PI controller, that any suitable control system can be used.

In one embodiment, the control system can use at least two different control loops to manage the power distribution to the component. In an embodiment, the control system can use a first control loop that can perform a first control loop operation in accordance with a first time interval and a second control loop that can perform a second control loop operation in accordance with a second time interval that is different than the first time interval. In other words, the first control loop operation the second control loop operation are performed over the first time interval and the second time interval, respectively, and then first control loop operation the second control loop operation are repeated. Also, a monitored temperature or average of the monitored temperature may be calculated over the first time interval and over the second time interval. In one embodiment, the first time interval can be substantially longer than the second time interval. For example, the first time interval can be approximately in the range of 5-20 seconds whereas the second time interval can be approximately in the range of 5-20 milliseconds (ms). Accordingly, the first (slower) control loop can be used to manage the power distribution to the component in accordance with first temperature information by providing a first control signal based upon performing a first control loop operation. The temperature information can include any or all of, for example, a monitored temperature of the component, or an average of the monitored temperature of the component and so on.

Based upon the temperature information, the control system can use the first control loop to manage the power distribution to the component in accordance with the first time interval. Moreover, the control system can use the second (faster) control loop to manage the power distribution to the component based upon the temperature information. Accordingly, the control system can use the second control loop to manage the power distribution to the component in accordance with the second time interval. In one embodiment, the control system can compare the temperature information provided by the component to a first threshold value and based upon the comparison, provide the first control signal. Furthermore, the control system can compare the temperature information to a second threshold value and based upon the comparison, provide the second control signal. For example, the control system can compare a monitored component temperature to a first threshold value and, based upon that comparison, provide the first control signal. The control system can also compare the monitored temperature (or an average of the monitored temperature) to a second threshold and based upon that comparison, provide the second control signal.

In an embodiment, the first control loop can be continually active whilst the second control loop can be activated only when the temperature information is in accordance with the second threshold. The term "active" or "activated" as used throughout this detailed description and in the claims refers to a control loop performing a control loop operation (or operations) over a time interval. More specifically, the second control loop can be activated when the temperature information indicates that a monitored temperature of the component has at least reached the second threshold. Furthermore, the activated second control loop can be deactivated when the temperature information indicates that the monitored temperature is less than the second threshold by a pre-determined amount or other suitable condition. The term "deactivate" as used throughout this detailed description and in the claims refers to a control loop that is not performing a control loop operation (or operations) over a time interval. By selectively utilizing the second control loop, the control system can mitigate the extra power required to perform the second control loop operation. It should be noted that in some embodiments, the first and second control loops can be active at the same time, each providing a first control signal and a second control signal, respectively. In this situation, the control system can select which of the concurrently available control signals to use for managing the power distribution to the component. In one embodiment, the control system can use the control signal that has been determined to be the more effective, that is, which control signal has a larger power reduction. In order to determine the most effective power reduction control signal, a prediction of the power reduction for each control signal can be made and based upon the prediction, the control system can select one or the other of the two available control signals to use.

It should be noted that in addition to using at least two control loops, in some cases, the control system can use only a single control loop. More specifically, the single loop control system can activate a control loop that performs a control loop operation in accordance with the second (fast) time interval when the temperature information indicates that that second threshold has been reached. In this way, the single loop controller can manage the power distribution to the component in accordance with the second time interval without the need for using a first (slower) control loop to maintain the component at a temperature near the first threshold.

In one embodiment, the control system can perform the first control loop operation associated with the first control loop in the background. In this case, the control system can provide a first control signal in the form of, for example, a first power reduction control signal, when the temperature information indicates that the first threshold has been reached. Alternatively, the control system can activate the first control loop to perform the first control loop operation only when the temperature information indicates that the first threshold has been reached. The control system can also activate the second control loop only when the temperature information indicates that the second threshold has been reached. In some embodiments, activating the second control loop has the effect of deactivating the first control loop. In other embodiments, the first and second control loops can both be active in which case the control system has an option to provide a first or second control signal, or a combination thereof. In another embodiment, the control system can provide a control signal that is based upon a current condition of the component. For example, the control system can provide a second control signal in accordance with a determination of positive temperature variance between the second threshold and the monitored temperature. More specifically, as the difference between the second threshold and the monitored temperature (or other appropriate metric) changes, a power reduction control signal provided by the control system can also change. In this way, as the temperature difference increases, the power reduction control signal provided by the control system can reflect the need to be more aggressive in reducing the temperature of the component (and vice versa).

In some embodiments, the component is an integrated circuit. Some components, such as a graphics processing unit ("GPU") or a central processing unit ("CPU"), are configured to perform at a high operating capacity which may generate a relatively large amount of heat. A high operating capacity of a component may include increased frequency of operations of the component, increased duty cycles of the component, increased electrical current to the component, or a combination thereof. It should be noted that management of the power distribution by the control system can be accomplished in many ways. For example, the control system can issue one or more control signals that can be used to change a clock cycle (frequency of operations) of the component and/or reduce a supply voltage applied to the component and/or reduce an amount of current available to the component.

Also, in some embodiments, the first control loop is activated and deactivated based on a first set of criteria. For example, one criterion for activating the first control loop is when the monitored temperature of the components reaches a first threshold temperature. In some embodiments, a criterion for deactivating the first control loop is deactivated when the monitored temperature falls below the first threshold temperature. In other embodiments, a criterion for deactivating the first control loop is deactivated when the monitored temperature reaches a second threshold temperature greater than the first threshold temperature. The monitored temperature reaching the second threshold temperature may also be the criterion for activating a second control loop. Once the second control loop is activated, the second control loop may be subsequently deactivated based on a second set of criteria. For example, in some embodiments, a criterion for deactivating the second control loop includes the monitored temperature falls below the second threshold temperature. In other embodiments, a criterion for deactivating the second control loop includes the monitored temperature falling below the second threshold temperature for a sufficient period such that an integral term (discussed below) is at or below zero. In either event, in some cases, the criteria for deactivating the second control loop is also the criteria for activating the first control loop (in cases where the first control loop is configured to deactivate).

These and other embodiments are discussed below with reference to FIGS. 1-6. However, those skilled in the art will readily appreciate that the detailed description given herein with respect to these figures is for explanatory purposes only and should not be construed as limiting.

Figure 1:
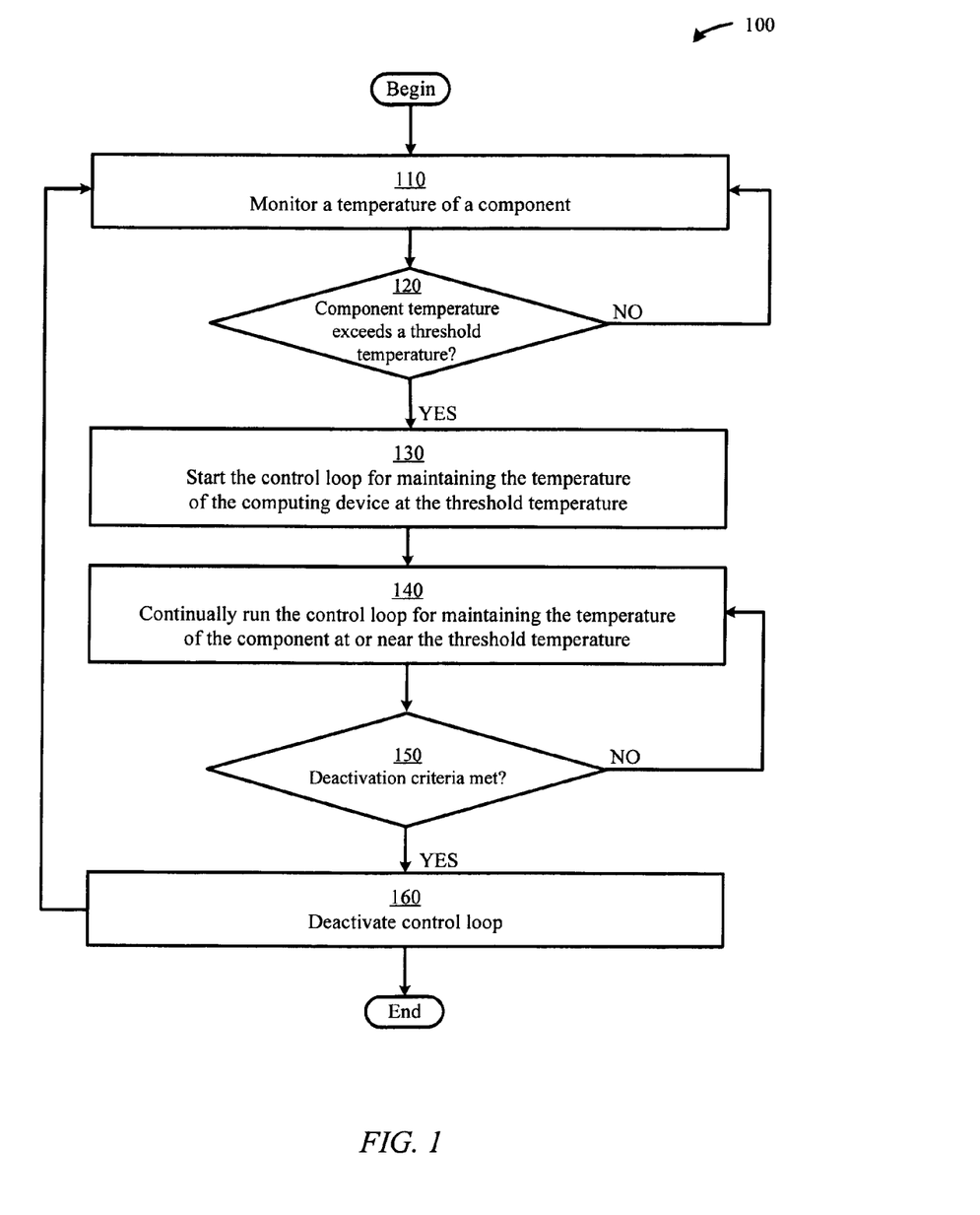
FIG. 1 illustrates a flowchart showing a method for managing and controlling power to a component by limiting a control loop to only run under certain high power (or high temperature) conditions, in accordance with the described embodiments.

FIG. 1 illustrates a flowchart describing a method 100 for using a control loop to maintain temperature of a component in a computing device at or below a threshold temperature. In some embodiments, the component is an integrated circuit. In other embodiments, the component is a die having several integrated circuits. Also, in some embodiments, the control loop is a second control loop that is part of a control system previously described. In other embodiments, the control loop is a first control loop previously described. In step 110, the method begins by monitoring the temperature of the component. In some embodiments, a temperature sensor in the computing device monitors the component temperature. In other embodiments, the component includes a threshold detector that may output a temperature or a signal to the control loop. In step 120, a determination is made whether the temperature of the component reaches or exceeds a threshold temperature. In some embodiments, the threshold temperature is a second threshold temperature (associated with the second control loop) previously described. In some embodiments, the second threshold temperature is a temperature below the specification limit of the component, such that the control loop responds in sufficient time to prevent the component temperature from reaching the specification limit. If the component temperature has not exceeded the threshold temperature, then the method returns to step 110 for further temperature monitoring.

If the temperature reaches or exceeds the threshold temperature, then the method proceeds to step 130, where the control loop is activated in order to maintain the temperature of the component at or near the threshold temperature. In some embodiments, the control loop consumes approximately 10 mW of power when the control loop is active (i.e., when the control loop is maintaining the temperature). When active, the control loop continually runs in order to maintain the component temperature, as shown in step 140. In some embodiments the control loop maintains the component temperature by outputting a power reduction control signal in order to reduce power to the component.

Next, in step 150, a determination is made whether deactivation criteria has been met. In some embodiments, the deactivation criteria include the monitored temperature of the component remaining below the threshold temperature for a sufficient time (discussed later). In other embodiments, the deactivation criteria include the monitored temperature falling below the threshold temperature. If the deactivation criteria are not met, then the method returns to step 140 for further temperature monitoring. If the deactivation criteria are met, then the method proceeds to step 160, in which case the control loop deactivates, or releases control of power distribution, to the component. By configuring the control loop to release control, the overall internal power of the computing device is conserved. After the control loop releases control, the method returns to step 110.

Figure 2A:
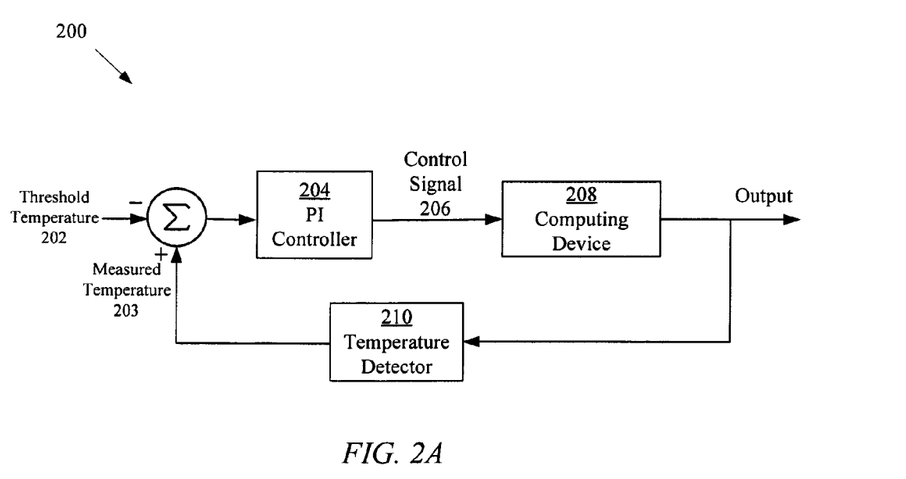
FIG. 2A illustrates a diagram of a proportional-integral ("PI") control loop used to maintain a temperature of a component at a threshold temperature, in accordance with the described embodiments.

FIG. 2A illustrates a diagram 200 of a PI controller used to maintain a temperature of a component at a threshold temperature 202. The PI controller 204 includes a processor configured to run an algorithm or software for controlling power to the component in situations where the threshold temperature 202 is reached or exceeded. In some embodiments, PI controller 204 is a generic control loop feedback. In the embodiment shown in FIG. 2A, PI controller 204 is a control loop configured to reduce power distribution to a component in the computing device 208 during, for example, a high temperature/power operating event. The computing device 208 generates a temperature output measured by temperature detector 210. The measured temperature 203 from temperature detector 210 is then compared with threshold temperature 202. Based on the comparison, the PI controller 204 is configured to send control signal 206 to the component in the computing device 208. Control signal 206 may result in reducing power distribution to the component by, for example, limiting the frequency of operations of the component.

Figure 2B:
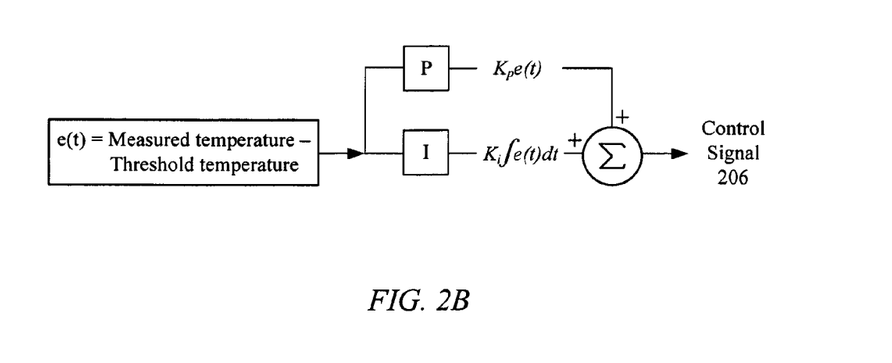
FIG. 2B illustrates a diagram showing an embodiment of a PI control loop using an error value and an integral of the error value to generate a control signal, in accordance with the described embodiments.

FIG. 2B illustrates a diagram showing the equations used to generate input to the PI controller 204 shown in FIG. 2A. In some embodiments, the PI controller is a second control loop previously described, and may be referred to as such. The second control loop includes a proportional term ("P") and an integral term ("I"). Both the proportional term and the integral term are dependent upon the measured temperature 203 and the threshold temperature 202 described in FIG. 2A. The difference between the measured temperature and the threshold temperature is shown as an error value, e(t), which is used to generate a control signal 206 from the PI controller (shown in FIG. 2A) in order maintain the computing device (in particular, a component) at or below threshold temperature 202 (shown in FIG. 2A). The proportional term and an integral term of the control loop are as follows:

$$\text{Proportional term} = Kp \times e(t)$$

$$\text{Integral term} = Ki \times \int e(t)dt \text{ (continuous function)}$$

$$\left( \text{OR Integral term} = Ki \times \sum_{i=0}^{n} e(t_i) \text{ (discrete samples)} \right)$$

where

Error value $e(t)$ = Measured temperature − Threshold temperature

The proportional term is determined by multiplying a gain, Kp, by the difference between the measured temperature and the threshold temperature. The proportional term is positive (greater than zero) when the measured temperature is above the threshold temperature and negative when the measured temperature is below the threshold temperature. Further, the proportional term is zero when the measured temperature is equal to the threshold temperature. The integral term (also shown as a summation, $\Sigma$) is determined by multiplying a gain, Ki, by the integral of the difference between the measured temperature and the threshold temperature. Since the measured temperature is sampled periodically, the integral term is also a gain, Ki, multiplied by the sum of the measured temperature minus the threshold temperature from a time interval from $t_0$ to $t_n$. Also, in some embodiments, the periodic temperature sampling of the second control loop is calculated as an average temperature over a time interval. In some embodiments, the difference between measured and threshold temperature is determined every several milliseconds, and accordingly the integral term is updated on the order of several milliseconds.

By sampling on the order of milliseconds, the second control loop is configured to activate and react quickly to temperature increases of the component in order to maintain the temperature of the component at the threshold temperature, thereby preventing damage to the component. Further, by using an integral term, the second control loop is configured to accelerate the movement of the component temperature towards the threshold temperature and eliminate the residual steady-state error that occurs with a pure proportional control loop. In some embodiments, the second control loop, while active, outputs a power reduction signal less than a power reduction signal output by a first control loop. In this case, the first control loop controls power distribution despite the second control loop being active. Conversely, the second control loop outputs a power reduction signal greater than a power reduction signal output by the first control loop. In this case, the second control loop controls power distribution despite the second control loop being active.

However, in some embodiments, when the integral term previously described is equal to zero, the second control loop is configured to deactivate and release control of power distribution to another controller. In some embodiments, the other controller is a first control loop configured to run a first control loop operation at a first time interval. In some embodiments, the first time interval is approximately in the range of 1-10 seconds. Recall the second time interval is approximately in the range of 5-20 milliseconds. Since the second time interval is substantially less than the first time interval (i.e., the second time interval is approximately 1,000 times shorter than the first time interval), the second control loop may activate and subsequently deactivate within the first time interval. In other words, the first control loop may release and subsequently regain control within the first time interval. This may contribute to minimal interruption and overall better operation of the component and/or the computing device.

Figure 3:
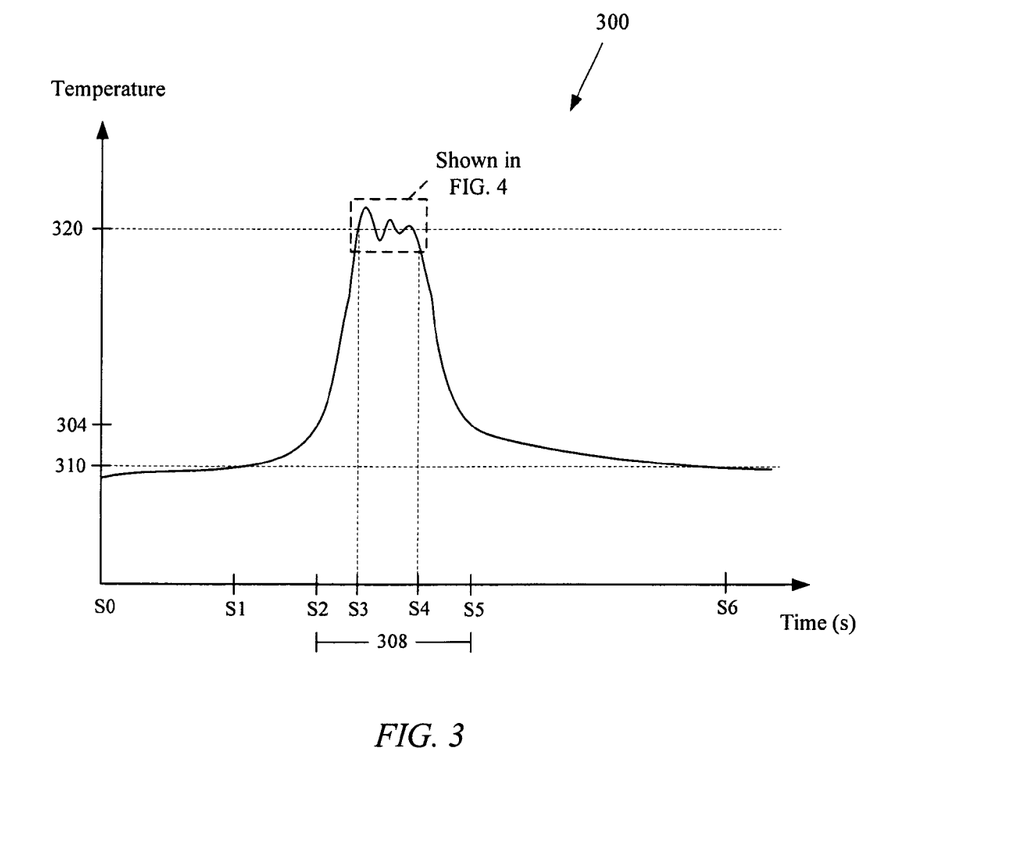
FIG. 3 illustrates a temperature profile curve of a component controlled by a control system having a dual control loop, in accordance with the described embodiments.
Figure 4:
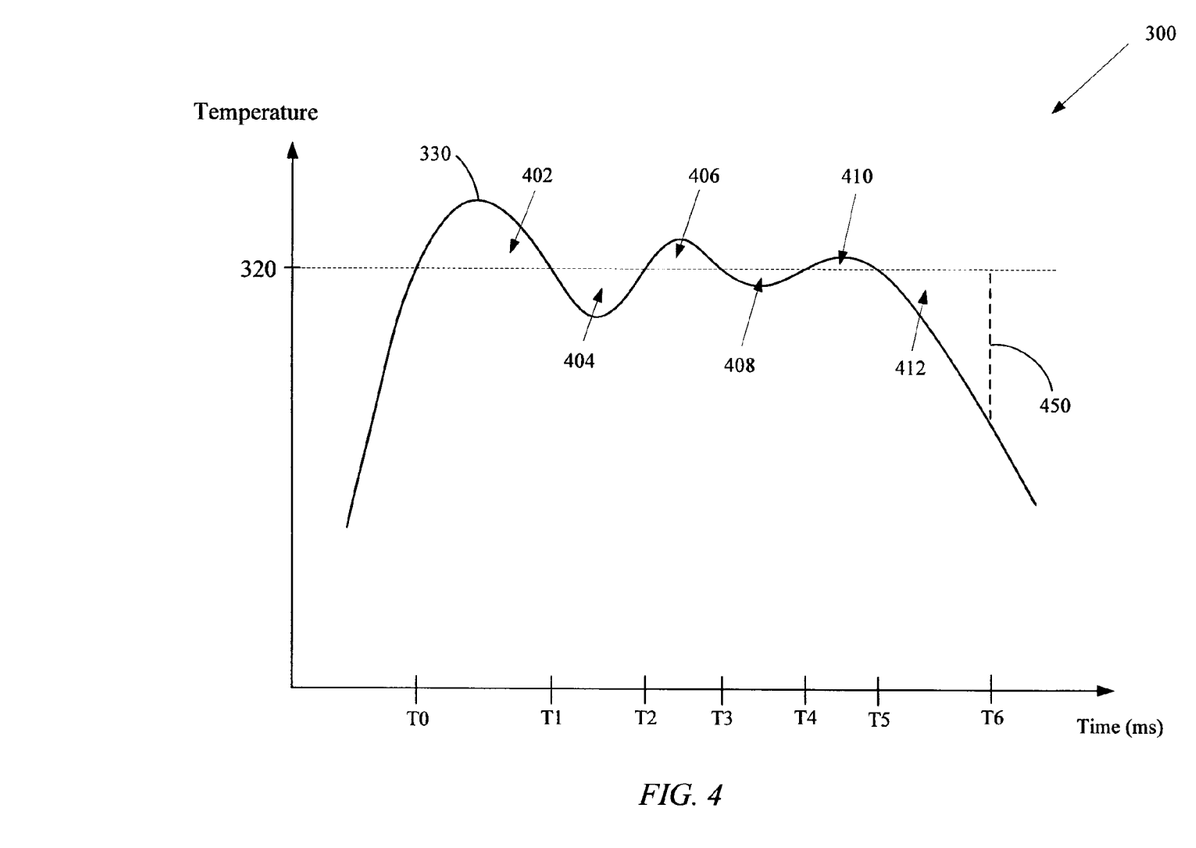
FIG. 4 illustrates a temperature profile curve of a component controlled by a second control loop in accordance with the described embodiments.

FIGS. 3 and 4 illustrate a component temperature, shown as temperature profile curve 300 of a component, controlled by a control system (in a computing device) that uses a first control loop to provide a first control signal in accordance with a first time interval, and a second control loop to provide a second control signal in accordance with a second time interval different than the first time interval. In some embodiments, the control system is a proportional-integral-derivate (PID) controller. In FIGS. 3 and 4, the control system is a proportional-integral (PI) controller. In FIG. 3, temperature profile curve 300 rises during a thermal excursion 308 (e.g., a high operating capacity event) and later falls after the thermal excursion 308. Also, FIG. 3 shows temperature profile curve 300 maintained by a second control loop controlling power distribution to the component during a portion of a thermal excursion 308 (shown in further detail in FIG. 4). Temperature profile curve 300 may also be referred to as the monitored temperature of the component. In some embodiments, the monitored temperature of the component can be provided to the control system by a discrete temperature monitor that periodically samples the temperature of the component. In other embodiments, a sensor disposed within the component periodically samples the component temperature and outputs the component temperature to the control system.

Referring to FIG. 3, temperature profile curve 300 can be described along times S0 through S6. From time S0 to time S1, temperature profile curve 300 is below first threshold temperature 310, which is temperature at which the first control loop is maintaining the component temperature. In some embodiments, the control system utilizes a first control loop that is continuously active to manage power distribution to the component. In this manner, the first control loop outputs a first power reduction control signal. In other embodiments, the first control loop is inactive (i.e., not controlling power) in order to conserve internal power of a computing device. In either event, when temperature profile curve 300 exceeds first threshold temperature 310, for example subsequent to time S1, the first control loop controls power distribution to the component. In some embodiments, the first control loop uses the temperature information to perform a first control loop operation at a first time interval. In some embodiments, the first time interval is approximately in the range of 1-10 seconds. Also, in some embodiments, the first control loop operation outputs a first power reduction control signal in order to reduce power distribution to the component. This may be used to maintain the (monitored) component temperature, or an average of the component temperature, near first threshold temperature 310. Also, in some embodiments, a first control loop operation includes a comparison of the monitored temperature to first threshold temperature 310 and outputting a signal (e.g., first power reduction signal) based on the difference between the monitored temperature and first threshold temperature 310. Rather than using the monitored temperature, in some embodiments, the control system used the average of the monitored temperature over, for example, a first time interval.

At time S2, temperature profile curve 300 begins to sharply rise in response to the component undergoing a thermal excursion 308, which in one embodiment can be associated with an underlying cause, such as a "burst mode" operation. The thermal excursion 308 generally lasts from time S2 to time S5, corresponding to a time period in which temperature profile curve 300 remains at or above temperature 304 greater than first threshold temperature 310. At time S3, temperature profile curve 300 reaches a second threshold temperature 320, and the control system activates a second control loop to manage power distribution to the component. The second control loop generates a second control signal to manage power distribution to the component. In some embodiments, activating the second control loop deactivates the first control loop. In other embodiments, the first control loop and the second control loop are both active in which case the control system has an option to provide a first control signal or a second control signal, or a combination thereof. Also, in some embodiments, the second control loop uses the temperature information to perform a second control loop operation at a second time interval. The second control loop operation may perform comparison between the monitored temperature, or an average of the monitored temperature, and output a signal based on the difference. In some embodiments, the second time interval is approximately in the range of 5-20 milliseconds. Also, in some embodiments, the second control loop operation outputs a second power reduction control signal in order to reduce power distribution to the component and maintain the component temperature near second threshold temperature 320. Because the second control loop operates over a significantly shorter interval than that of the first control loop, the second control loop is configured to react more quickly to increased component temperature than the first control loop.

Once the monitored temperature is below second threshold temperature 320, the control system may deactivate the second control loop. At time S4, the second control loop releases control to the first loop. In some embodiments, the control system deactivates the second control loop when an average of the monitored temperature falls below the second threshold value. A process for deactivating the second control loop will be explained in FIG. 4. From time S4 to time S5, the first control loop, if previously deactivated by the control system, regains control of power distribution to the component. Also, from time S4 to time S5, temperature profile curve 300 moves in a direction toward first threshold temperature 310 as the underlying cause for the thermal excursion 308 ceases. From time S5 to time S6, the first control loop continues to control power distribution, and at time S6, temperature profile curve 300 is at first threshold temperature 310. Subsequent to time S6, in some embodiments, the first control loop is active and configured to control power to the component. In other embodiments, the first control loop is deactivates in order to conserve internal power of a computing device.

FIG. 4 illustrates a close-up view of the temperature profile curve 300 showing a condition for activating and deactivating the second control loop. In some embodiments, the control system can be configured to activate the second control loop when temperature profile curve 300 reaches or exceeds second threshold temperature 320, and the second control loop outputs a power reduction control signal in order to reduce power distribution to the component. It should be understood that the first control loop still controls power until at least temperature profile curve 300 reaches second threshold temperature 320, shown at time T0. Also, in some embodiments, the second control loop is deactivated when the component temperature is less than the second threshold 320 by a pre-determined amount. In the embodiment shown in FIGS. 3 and 4, the second control loop is deactivated when the integral term is equal to zero (or in some cases, less than zero).

From time T0 to time T6, the second control loop is active to control power distribution to the component such that the component temperature is kept proximate to second threshold temperature 320. In some embodiments, the second control loop continuously controls power distribution until the second control loop is deactivated by the control system. In other embodiments, the control system compares the component temperature with second threshold temperature 320. Based upon that comparison, the control system may use either the first control loop or the second control loop. For example, if the component temperature falls, the control system may release some control of the second control loop allowing the first control loop to regulate power distribution to the component. However, the component temperature may later increase again. If the component temperature increases, the control system may allow the second control loop to regain control of power distribution to the component and reduce the component temperature below second threshold temperature 320.

Alternatively, in some embodiments, the second control loop is configured to control power distribution when the component temperature rises above the threshold temperature 320, and the first control loop is configured to control power distribution when the component temperature drops below threshold temperature 320. In this manner, the component may perform at a high operating capacity even while the component temperature is regulated to remain below the specification limit of the component, allowing the component to run at a relatively high temperature for a short period of time, which decreases the risk of failure for the component.

FIG. 4 further illustrates the control system using the integral term in order to deactivate the second control loop. Recall the integral term may be a summation of several areas associated with the difference between the (instantaneous) component temperature and a threshold temperature.

In FIG. 4, the component temperature is temperature profile curve 300, and threshold temperature is second threshold temperature 320. The integral term corresponds to the area between the temperature profile curve 300 and second threshold temperature 320 from time T0 to time T6. For example, area 402 represents a first portion of the integral term from time T0 to time T1. Area 402 is greater than zero because temperature profile curve 300 is at or above the threshold temperature for all time between time T0 and time T1. Alternatively, area 402 may be considered as "positive." On the other hand, area 404, representing a second portion of the integral term from time T1 to time T2, is less than zero because temperature profile curve 300 is at or below second threshold temperature 320 for all time between time T1 and time T2. As such, area 404 may be referred to as "negative."

From time T0 to time T2, the integral term is the sum of area 402 and area 404. In FIG. 4, area 402 is greater than area 404 and accordingly, the integral term is greater than zero from time T0 to time T2. Therefore, the second control loop remains active and may control power distribution to the component. Between time T2 and time T5, temperature profile curve 300 oscillates above and below second threshold temperature 320. Accordingly, area 406, area 408, and area 410 correspond to areas between temperature profile curve 300 and second threshold temperature 320 between time T2 and time T5.

In order for the integral term to equal zero, the combined area above second threshold temperature 320 must be equal to (or less than) the combined area below second threshold temperature 320. Generally, due to the temperature spike at the beginning of a high operating capacity event, temperature profile curve 300 reaches a peak temperature 330 shortly after the second control loop activates. For example, as shown in FIG. 4, area 402, associated with time T0 and time T1, is larger than subsequent areas. In other words, area 402 which contains peak temperature 330 is larger than area 404, area 406, area 408, and area 410. More importantly, the combined area of area 402, area 406, and area 410 (the positive areas) is greater than the combined area of area 404 and area 408, and accordingly the control loop remains active at time T5.

However, at time T6, the combined area 404, area 408, and area 412 is equal to the combined area 402, area 406, and area 410. Area 412 is the area confined between temperature profile curve 300, second threshold temperature 320, and an imaginary vertical line 450 extending from second threshold temperature 320 at time T6 to temperature profile curve 300. At time T6, the integral term is zero. Time T6 also represents a time when the component temperature has a sufficient history below second threshold temperature 320 such that the control system deactivates the second control loop and the first control loop solely controls the power distribution. The second control loop is effectively stopped from controlling power distribution. Also, the control system does not reactivate the second control loop for any subsequent increases (not shown) in component temperature unless the component temperature again exceeds second threshold temperature 320. Further, time T6 may also signal the component is in a low-power mode.

Whereas FIG. 3 shows the time axis on the order of seconds, FIG. 4 shows the time axis on the order of milliseconds to illustrate the relatively short time intervals associated with the second control loop. Due to the disparity in time intervals, the first control loop may be referred to as the "slow control loop" and the second control loop may be referred to as the "fast control loop." As a result, the control system can use the second control to quickly manage the power distribution in instances such as rapid temperature increase of the component. This causes the second control loop to consume more power than the first control loop. However, because the second control loop is selectively activated and deactivated, the power consumption of the computing device is not increased by a substantial amount, and the overall power consumption may be conserved.

Figure 5:
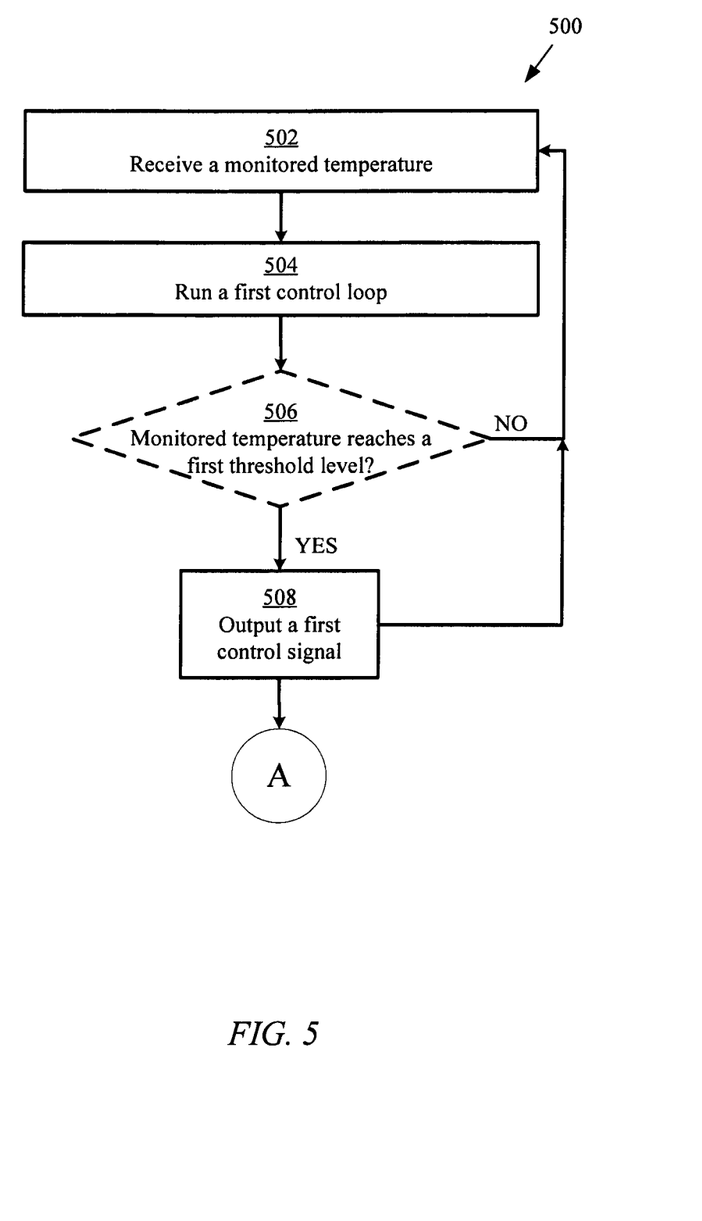
FIGS. 5 and 6 illustrate a flowchart showing a method for controlling a temperature of a component in a computing device, in accordance with the described embodiments.
Figure 6:
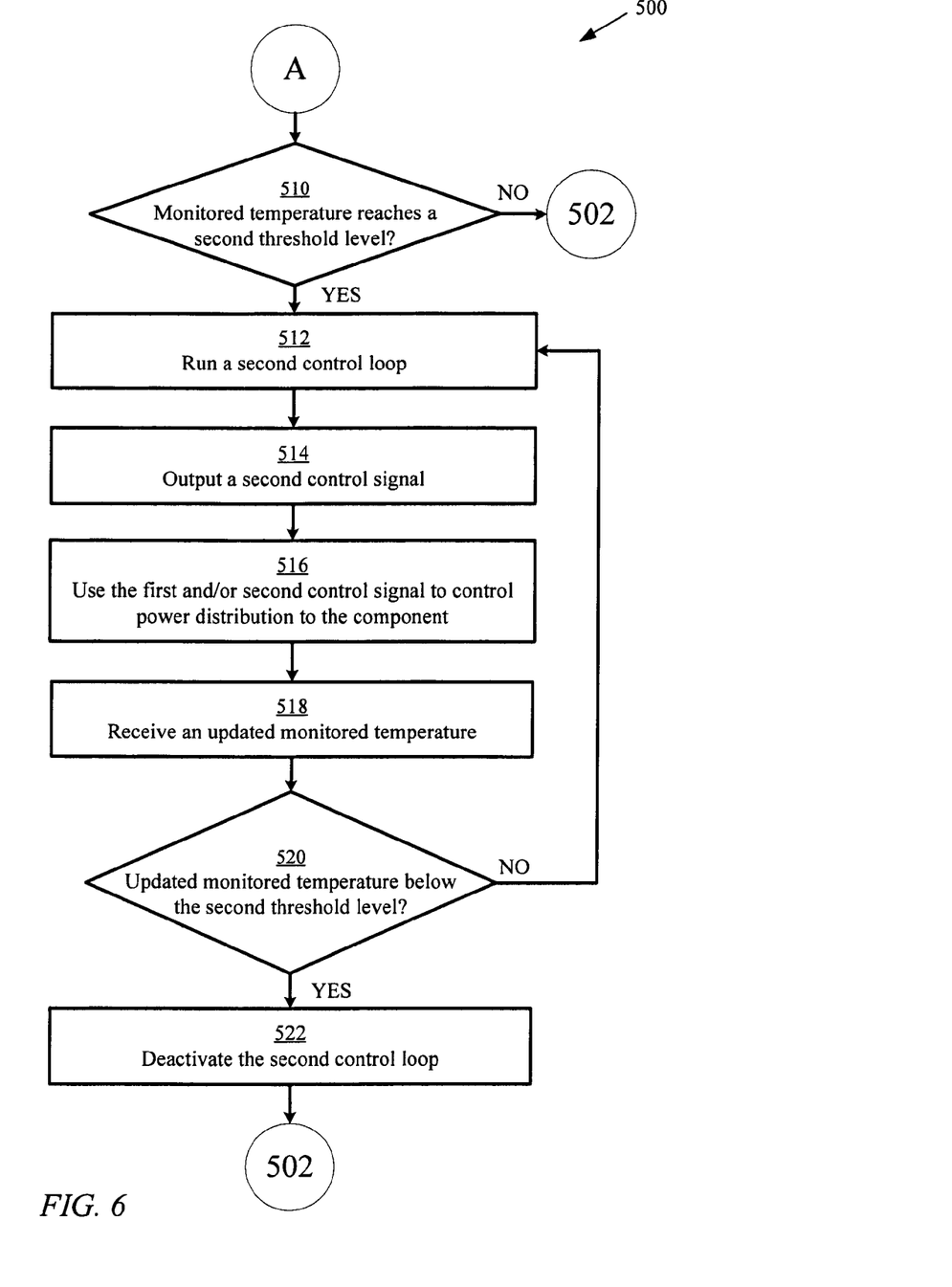

FIGS. 5 and 6 illustrate a flowchart 500 showing a method for controlling a temperature of a component in a computing device. The method includes a control system previously described having a first control loop and a second control loop. In step 502, the component temperature is received by the control system. In some embodiments, the monitored temperature of the component can be provided to the control system by a discrete temperature monitor that periodically samples the temperature of the component. In other embodiments, a sensor disposed within the component periodically samples the component temperature and outputs the component temperature to the control system. In step 504, the control system runs the first control loop. In some embodiments, the first control loop is performed in accordance with a first time interval approximately in the range of 1-10 seconds.

In an optional step 506, a determination is made whether the monitored temperature reaches (or exceeds) a first threshold level. In some embodiments, the first threshold value is a temperature value approximately in the range of 70-80° C. If the monitored temperature does not reach the first threshold level, the method returns to step 502 to receive an updated monitored temperature. If the monitored temperature reaches or exceeds the first threshold level, a first control signal is output. In some embodiments, the first control signal is based on a difference between the monitored temperature of the component (or in some cases, the average of the monitored temperature) and the first threshold level, where the first threshold level is a temperature value previously described.

In step 508, a first control signal is output when the first control loop is running. In some embodiments, the first control signal is a first power reduction control signal configured to reduce power to the component. The first power reduction control signal may be configured to reduce the frequency of operations of the component, reduce the duty cycles of the component, reduce electrical current to the component, or a combination thereof. Then in step 510 (see FIG. 6), a determination is made whether the monitored temperature reaches (or exceeds) a second threshold level. In some embodiments, the second threshold value is a temperature value approximately in the range of 90-100° C. If the monitored temperature does not reach the second threshold level, the method returns to step 502 to receive an updated monitored temperature. If the monitored temperature reaches or exceeds the second threshold level, then the second control loop is run, as shown in step 512. In some embodiments, the second control loop is performed in accordance with a second time interval. The second time interval may last less than 1 second. In some embodiments, the second time interval is approximately in the range of 5-20 milliseconds.

Once the second control loop is running, the second control loop outputs a second control signal as shown in step 514. In some embodiments, the second control signal is a second power reduction control signal. The second power reduction control signal may include any power reduction control signal used by the first power reduction control signal. Also, because the first and second control loops are running, the control system has the option of using the first control loop and/or the second control loop to control power distribution to the component, as shown in step 516. In some embodiments, the control loop selects either the first power reduction control signal or the second power reduction control signal based on which of the two power reduction control signals is greater. For example, the control system may select the second power reduction control signal because the second power reduction control signal is reducing the duty cycles and reducing electrical current to the component, whereas the first power reduction control signal (if selected) simply reduces the electrical current.

Then in step 518, the control system receives an updated monitored temperature. Based on the updated monitored temperature, a determination is made whether the updated monitored temperature is below the second threshold level, as shown in step 520. If the updated monitored temperature remains at or above the second threshold value, then the method returns to step 512 and the second loop continues running. If the updated monitored temperature is below the second threshold value, then the control system deactivates the second control loop, as shown in step 522.

In some embodiments, when the second control loop is active, the second power reduction control signal of the second control loop solely controls the power reduction to the component. Also, in some embodiments, the magnitude or amount of power reduction is based upon a difference between the second threshold value and the monitored temperature. For example, a greater disparity between the monitored temperature and second threshold temperature 320 is akin to greater power reduction by the second power reduction control signal. This, of course, may occur during instances where the measured temperature is greater than second threshold temperature 320. Also, in other embodiments, when the second control loop is active, the control system may select from the first control signal and/or the second control signal such that the first and/or the second power reduction control signals, respectively, control power distribution to the component.

A control system having a dual control loop, one with a higher threshold temperature and one with a lower threshold temperature, has several advantages. For example, the first control loop with the lower threshold temperature allows the component to operate near the lower threshold temperature over a longer period of time which may increase the lifespan of the computing device. At the same time, the second control loop with the higher threshold temperature allows the component to operate at the higher threshold temperature for short periods of time, enabling the computing device for higher performance during those short periods of time while limiting overall power consumption.

Another benefit of the dual control loop is the ability to control leakage power. For example, some components may exhibit leakage power dependent on component temperature. In some cases, leakage power of a component may double with a 20-degree temperature increase (from, for example, 75° C. to 95° C.) in the component. By maintaining a high-performance component at a lower steady state temperature and allowing the component to increase 20 degrees during short periods, the overall leakage power may be significantly reduced. In other words, relatively high leakage power during periods of increased temperature is kept to a minimum.

Also, performance and reliability may depend on temperature. Regarding performance, because higher temperatures are associated with higher performance, a component may exhibit better performance at 95° C. as opposed to the component running at 75° C. However, when determining the lifespan of the component, operating temperature is a large factor in determining reliability and parts per million failures. For example, a component operating at 100% capacity at 95° C. for 3 or 5 years will likely have a lower reliability and higher parts per million failures than a component operating 100% at 75° C. for 3 or 5 years. Therefore, it is advantageous to maintain lower temperatures. The dual control loop implementation allows the device to enjoy the higher reliability by keeping temperatures of the component approximately at 75° C. using a first control loop, while still appearing to have higher performance associated with 95° C. component performance which is maintained by a second fast control loop. The end user gets not only high performance but greater reliability.

Alternatively, if the dual control loop implementation is replaced with a single 95° C. control loop, then a device designed to run for 5 years at 95° C. may require additional power to maintain original performance. For example, some components in the device may degrade and/or break down after several years, due in part to relatively high heat exposure. When this occurs, additional power (for example, 50 mV) may be required to compensate for the degradation or breaking down. The device battery must undergo additional charging and recharging due to additional power consumption. Accordingly, the end user may notice an overall decrease in performance with a single control loop as opposed to a dual control loop.

In conclusion, the advantages of the disclosed embodiments include performance, battery life, and reliability. In addition, a power sensor is not required in the device, and fewer components generally translate to lower cost of goods. The absence of a power sensor also simplifies the design. Also, the disclosed embodiments perform thermal management in a reactive and not predictive manner, which results in relative simplicity of the design by only requiring the PI control loop to control the device when needed.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling device operations or as computer readable code on a computer readable medium for controlling a device. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method for controlling a temperature of a component in a computing device, the method comprising:
    monitoring the temperature of the component;
    performing a first control loop operation when the temperature of the component is greater than a first threshold value;
    outputting a first power reduction control signal in accordance with the first control loop operation; and
    when the temperature of the component is greater than a second threshold value, the second threshold value being greater than the first threshold value:
        i) performing a second control loop operation concurrent with the first control loop operation,
        ii) outputting a second power reduction control signal in accordance with the second control loop operation, and
        iii) using the first or second power reduction signal, depending upon which signal provides the greatest power reduction, to control a power distribution to the component.

2. The method as recited in claim 1, wherein the first control loop operation is performed in accordance with a first time interval and wherein the second control loop operation is performed in accordance with a second time interval, wherein the second time interval is smaller than the first time interval.

3. The method as recited in claim 2, wherein the first time interval is greater than or equal to 1 second and wherein the second time interval is less than 1 second.

4. The method as recited in claim 1, wherein a magnitude of a power reduction associated with the second power reduction control signal is based upon a difference between the second threshold value and the temperature of the component.

5. The method as recited in claim 1, further comprising deactivating the second control loop when an average value of the temperature of the component falls below the second threshold value.

6. The method as recited in claim 1, wherein the second control loop is a proportional-integral (PI) control loop.

7. The method as recited in claim 6, further comprising:
    deactivating the (PI) control loop when the temperature of the component has dropped sufficiently below the second threshold value such that an integral term of the (PI) control loop is equal to about zero.

8. A method for controlling a temperature of a component in a computing device comprising:
    monitoring the temperature of the component;
    when a first threshold temperature is exceeded, performing a first control loop operation in accordance with a first time interval using the monitored temperature;
    outputting a first control signal based on the first control loop operation;
    when a second threshold temperature that is greater than the first threshold temperature, is exceeded, concurrently performing a second control loop operation with the first control loop operation, the second control loop operation being performed in accordance with a second time interval;
    outputting a second control signal based on the second control loop operation; and
    concurrently using both the first and second control signals to control a power distribution to the component.

9. The method as recited in claim 8, wherein performing the first control loop comprises calculating an average value of the monitored temperature over a monitoring interval and calculating a difference between the average value and the first threshold temperature.

10. The method as recited in claim 8, further comprising deactivating the second control loop when an average value of the monitored temperature, while the second control loop is performed, falls below the second threshold temperature.

11. The method as recited in claim 8, wherein performing the second control loop operation comprises calculating a difference between the monitored temperature and the second threshold temperature.

12. The method as recited in claim 8, wherein the first time interval is larger than the second time interval.

13. A device having a component, comprising:
    a controller configured to:
        receive temperature information associated with the component,
        perform a first control loop operation using the temperature information in accordance with a first time interval,
        output a first control signal based upon the first control loop operation,
        concurrently perform a second control loop operation using the temperature information in accordance with a second time interval while the first control loop operation performs,
        output a second control signal based upon the second control loop operation;
        select one of the first or second control signals to control a power distribution to the computing component based on which of the first or second control signal provides the greatest power reduction, and use the selected control signal to control the power distribution to the computing component.

14. The device as recited in claim 13, wherein the second control loop operation comprises calculating a difference between the temperature information and a threshold value.

15. The device as recited in claim 13, wherein the first control loop operation comprises calculating an average value of the temperature information over a monitoring interval and calculating a difference between the average value and a threshold value.

16. The device as recited in claim 13, wherein the first time interval is larger than the second time interval.

17. The device as recited in claim 13, wherein the second control loop operation is comprised of a proportional-integral (PI) control loop that is activated when temperature information exceeds a threshold value, the (PI) control loop comprising:

a (PI) control loop operation performed in accordance with the second time interval; and a PI control signal outputted based on the PI control loop operation.

18. The device as recited in claim 17, wherein the (PI) control loop operation stops when the temperature information drops sufficiently below the threshold value such that an integral term of the (PI) control loop is equal to about zero.

19. The method as recited in claim 2, wherein the first time interval is greater than 1 second and wherein the second time interval is less than or equal to 1 second.

* * * * *